US010647087B2

(12) United States Patent
Figueroa et al.

(10) Patent No.: US 10,647,087 B2
(45) Date of Patent: May 12, 2020

(54) EMBLEM ADHESIVE REMOVAL METHODS

(71) Applicant: Cintas Corporate Services, Inc., Cincinnati, OH (US)

(72) Inventors: Manuel Figueroa, Cooper City, FL (US); Susan Lillard, Norwood, OH (US); Christopher R. Ventura, Cincinnati, OH (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 0 days.

(21) Appl. No.: 16/123,407

(22) Filed: Sep. 6, 2018

(65) Prior Publication Data

US 2019/0001615 A1 Jan. 3, 2019

Related U.S. Application Data

(62) Division of application No. 15/441,299, filed on Feb. 24, 2017.

(Continued)

(51) Int. Cl.
*B32B 5/02* (2006.01)
*B32B 5/08* (2006.01)
(Continued)

(52) U.S. Cl.
CPC ............... *B32B 5/028* (2013.01); *B32B 3/02* (2013.01); *B32B 3/266* (2013.01); *B32B 5/08* (2013.01);
(Continued)

(58) Field of Classification Search
CPC ........... B32B 5/028; B32B 3/02; B32B 3/266; B32B 5/08; B32B 5/26; B32B 7/12;
(Continued)

(56) References Cited

U.S. PATENT DOCUMENTS 3,657,060 A 4/1972 Haigh
4,549,916 A 10/1985 Off et al.
(Continued)

FOREIGN PATENT DOCUMENTS

EP 0056529 A2 7/1982
WO 00/07671 A1 2/2000
WO 2011/131569 A1 10/2011

OTHER PUBLICATIONS

Flexcon, Window Graphics, Perforated—Interior & Exterior Mount, Brochure, 2 pgs.

(Continued)

*Primary Examiner* — Vincent Tatesure
(74) *Attorney, Agent, or Firm* — Wood Herron & Evans LLP

(57) ABSTRACT

An adhesive assembly can be used to join textile materials together creating a durable wash resistant. An emblem can be removed from a work shirt without leaving glue stains or residue. The shirt may be reused if emblems need to be removed or changed before the life of the garment expires. In various embodiments, a layer of mesh is incorporated into the heat activated glue on the back of the emblem. This mesh does not affect adherence to the garment. The emblem sticks just as well as without the mesh layer and with zero process changes to how the emblem is applied. The mesh allows for the complete removal of the adhesive from the garment when the patch is removed allowing the garment to be used even after the patch is removed.

26 Claims, 3 Drawing Sheets

Related U.S. Application Data

(60) Provisional application No. 62/299,599, filed on Feb. 25, 2016.

(51) Int. Cl.
  *B32B 5/26* (2006.01)
  *B32B 27/12* (2006.01)
  *B32B 27/28* (2006.01)
  *B32B 27/30* (2006.01)
  *B32B 27/32* (2006.01)
  *B32B 27/40* (2006.01)
  *B32B 37/12* (2006.01)
  *B32B 3/02* (2006.01)
  *B32B 3/26* (2006.01)
  *B32B 7/12* (2006.01)
  *B32B 37/06* (2006.01)
  *B32B 37/08* (2006.01)
  *B32B 37/14* (2006.01)
  *B32B 38/10* (2006.01)

(52) U.S. Cl.
  CPC ............. *B32B 5/26* (2013.01); *B32B 7/12* (2013.01); *B32B 27/12* (2013.01); *B32B 27/283* (2013.01); *B32B 27/304* (2013.01); *B32B 27/306* (2013.01); *B32B 27/32* (2013.01); *B32B 27/40* (2013.01); *B32B 37/06* (2013.01); *B32B 37/08* (2013.01); *B32B 37/12* (2013.01); *B32B 37/14* (2013.01); *B32B 38/10* (2013.01); *B32B 2250/03* (2013.01); *B32B 2250/20* (2013.01); *B32B 2260/021* (2013.01); *B32B 2307/748* (2013.01); *B32B 2405/00* (2013.01); *B32B 2519/00* (2013.01)

(58) Field of Classification Search
  CPC ..... B32B 27/12; B32B 27/283; B32B 27/304; B32B 27/306; B32B 27/32; B32B 27/40; B32B 37/06; B32B 37/08; B32B 37/12; B32B 37/14; B32B 38/10
  USPC .......................................................... 442/100
  See application file for complete search history.

(56) References Cited

U.S. PATENT DOCUMENTS

| | | |
|---|---|---|
| 4,610,904 A | 9/1986 | Mahn, Sr. et al. |
| 4,786,349 A | 11/1988 | Mahn, Sr. |
| 5,840,408 A | 11/1998 | Giansetto |
| 5,958,526 A | 9/1999 | Spickelmire |
| 6,106,937 A * | 8/2000 | Hamerski ............ A47G 1/175 248/205.3 |
| 6,241,841 B1 | 6/2001 | Mahn, Sr. et al. |
| 6,339,866 B1 | 1/2002 | French |
| 6,473,908 B1 | 11/2002 | Bontems |
| 7,758,938 B2 | 7/2010 | Hseih et al. |
| 8,021,731 B2 | 9/2011 | Herbig et al. |
| 8,398,804 B2 | 3/2013 | Baqai et al. |
| 8,759,468 B2 | 6/2014 | Zhang et al. |
| 2003/0020274 A1* | 1/2003 | Milliorn .................. G09F 3/02 283/81 |
| 2005/0181183 A1 | 8/2005 | Pacey |
| 2006/0010576 A1 | 1/2006 | Tse et al. |
| 2007/0212509 A1 | 9/2007 | Herbig et al. |
| 2009/0126122 A1 | 5/2009 | Nickel et al. |
| 2012/0298293 A1 | 11/2012 | Hseih et al. |

OTHER PUBLICATIONS

Flexcon, STSWBF2 8 Mil 60/40 White/Black Flexible Perforated Film REM.ADH.PERF'D, Brochure, 3 pgs.
Color-Dec, Technical Data Sheet, May 16, 2016, Data Sheet, 2 pgs.
Gene Medlock, Barrier Resins, Properties, Processing and Handling of EVOH, Pt. 1, Article, Mar. 14, 2017, 7 pgs.
International Searching Authority; Notification of Transmittal of the International Search Report and the Written Opinion of the International Searching Authority, or the Declaration; PCT/US17/19058; dated Feb. 23, 2017; 12 pgs.

* cited by examiner

EMBLEM ADHESIVE REMOVAL METHODS

CROSS REFERENCE TO RELATED APPLICATION

This is a divisional of U.S. patent application Ser. No. 15/441,299, filed on Feb. 24, 2017 which claimed the benefit of U.S. Provisional Patent Application Ser. No. 62/299,599, filed on Feb. 25, 2016. Each of these prior applications is herein incorporated by reference in its entirety.

BACKGROUND OF THE INVENTION

This invention generally relates to adhesive media, and more particularly, to an adhesive assembly for adhering an object to a substrate and the ability to remove the object without leaving adhesive residue on the substrate.

Objects, such as an emblem or patch, including, but not limited to, security badges, police badges, work badges, ski tickets, nametags, pictures, logos, identification media and/ or any other object that a user may desire to affix to another object or substrate, are typically sewn or conventionally mounted onto a substrate, such as, but not limited to, clothing and/or any other surface upon which it is desirable to affix an object. However, sewing and conventional mounting, such as Velcro® and mechanical fasteners, are time-consuming, expensive and cumbersome. Commonly, such objects, particularly badges or emblems, are glued or adhesively attached to the substrate, which is often a work shirt or other clothing item. Unfortunately, when the object or emblem is removed, the shirt or substrate can be damaged and adhesive residue remains on the shirt or substrate thereby reducing the ability to re-use the shirt or substrate due to the unsightly appearance of the adhesive residue.

Apparel and accessory manufacturers use various methods to construct garments and apply decoration and identification to garments and textiles. Common technologies include sewing, heat-sealing tapes or adhesives, sonic welding, direct embroidery and heat activated transfer.

Various methods are used for joining textile products together and for applying decoration and identification to textile materials. Sewing is most commonly used to join fabrics together and for attaching decorative elements. This process is both machinery and labor intensive.

Direct embroidery is another option and is typically performed by a machine that applies stitching of various colors and styles directly onto the fabric substrate to create a design. Embroidered designs have a much greater aesthetic value, and withstand repeated home and industrial launderings. However, direct embroidery remains a complex, expensive and time-consuming process as well. Emblems are discrete items containing decoration which are manufactured separately and post-applied by various means such as sewing or adhesive to textile articles, obviating some of the disadvantages of direct embroidery.

Sonic welding is another method used to apply decoration and identification to garments and textiles. This process requires the creation of unique, expensive special dies for any design to be applied. Sonic welding allows texturing, but also requires chemical compounds that some companies find unacceptable, and that can result in a product that does not withstand stretching or repeated home and industrial laundering.

Up until now the methods used for attaching fabric to fabric or decorations to fabric have required sewing which is time consumptive and to be performed economically requires machinery and skilled operators. Another method of permanently adhering textiles to textiles is through the application of heat to activate a thermoplastic adhesive. While these methods create durable washable bonding they are impractical for quickly bonding textile products together with the ability to easily and cleanly remove the object.

The apparel industry is gravitating toward quick-change low-inventory production, but the labor, inventory, and other costs associated with the foregoing techniques make them relatively slow and expensive. Consequently, embroiderers and other apparel customizers using these techniques typically require substantial minimum-quantity orders, and bulk orders are only justified where economics warrant the expenditure associated with sewn-in decorations or heat-sealing them onto products. Apparel manufacturers would much prefer to customize articles in small batches to keep turnaround time and inventory at a minimum. For smaller quantity orders, however, sewing and heat-sealing decorations onto apparel, home furnishings or luggage is costly and time consuming and often requires specialized equipment and skilled operators.

In a commercial environment industrial sewing equipment or heat presses would be necessary to set up and operate in production to decorate textile based items. In addition, the manufacture of heat applied bonding such as seams, appliqués and emblems requires special equipment to apply the adhesive to the base layer.

Though sewing and stitched embroidery are avoided in all of the foregoing cases to initially bond products, the resulting products cited above are inferior in durability and cannot withstand repeated washing or require additional process steps of sewing or heat-sealing. It would be greatly advantageous to consumers and industry to provide a method for adhesively bonding textile products, appliqués, emblems and other textile-based brand identification or fabrics to apparel and or accessories, headwear, crafts, home furnishings and luggage which is less time consuming and labor intensive than affixing by sewing or heat-sealing. Importantly, the ability to easily remove the emblem without damaging the article has become a significant need in the industry.

Many uniform suppliers, such as Cintas, the assignee of this invention, currently offer uniform direct sale and rental programs to customers of all types. For these customers, customized uniform embellishments in many varieties (embroidered emblems, screen print, direct embroidery, etc.) are available that serve to represent the customer's brand name, give customer recognition, and even show people's names. The majority of such customers are directed to select a style of uniform embellishment called an embroidered emblem. This is a small, usually rectangular patch of fabric that is embroidered with a company or individual name and then applied to a garment via heat activated glue. The embroidered emblems are delivered with glue, fabric, and thread all attached and in one piece and can be applied to "heat seal" the emblem to the garments. Heat sealing is a process of attaching an emblem to a garment using a heated hydraulic head that applies pressure and heat at a specific temperature for a specific amount of time.

Currently, such emblems can be removed from the garment substrate, but a nasty stain is left from the melted glue (see FIG. 3) which means the shirt can only be reused if an emblem of the same size (or bigger) is put on the garment in the exact same place. This limits the available garment embellishment styles and locations because the very costly risk of ruining garments.

Therefore, a solution for the clean removal of adhesively applied emblems such as embroidered emblems/patches/ other garment embellishments without leaving any scarring, glue stains or marks is needed. Such a solution could save significant sums of dollars annually as well as contribute significantly to the re-use of existing garments offering embellishments to users anywhere on the garment which is not viable without fully removable emblems and adhesive.

SUMMARY OF THE INVENTION

This invention relates to an emblem assembly which can be joined to substrate and create a durable wash resistant bond. This assembly can be used in place of the known techniques for textile materials which are desired to be joined to create a durable bond. The invention could be utilized to join a broad range of products including but not limited to adhering decorative textile transfers, emblems and appliqués that may be applied to a variety of different textile substrates, including apparel, headwear, accessories, textile crafts, luggage and/or home furnishings. The particular assembly is suited for bonding natural fibers such as cotton, silk and cellulosic such as rayon as well as synthetic fiber like polyester and blends thereof.

In various embodiments, this invention includes an emblem assembly that can be removed from a work shirt without leaving glue stains or residue. The assembly includes an emblem and is attachment scheme which must be able to withstand the life of the garment without fray, wear, tear, and removal and must maintain the high image quality and look while still performing to wash and wear test standards. This invention allows the garment to be reused if emblems need to be removed or changed before the life of the garment expires. This invention eliminates out of service garments due to glue and residue stains, and allows reuse of the garment until the garment is worn out.

In various embodiments, this invention includes an adhesive retention layer which in various embodiments is a mesh layer incorporated into the heat activated glue on the back of the emblem. This mesh is introduced during the manufacturing process and although you can see it when looking at the back, you cannot feel or touch it as it is embedded in a layer of glue. This mesh does not affect adherence to the garment. The emblem sticks just as well as without the mesh layer and with zero process changes to how the emblem is applied.

One key benefit of this invention is in the removal of the emblem. Previously when removing emblems, the operator would remove it in either of two ways, one of which is to re-activate the glue with the same heat seal machine used to apply the emblem. Once activated, the glue is gummy and emblem may be pulled off easily by hand. When this is done, much of the glue is leftover embedded in the fibers of the garment. The glue is so embedded it cannot be removed. It just pulls apart and becomes more and more intertwined in the garment fibers. The second removal method is called "cold pulling" and it is basically removing the emblem by force. No heat activation of the glue is used and the operator just grabs the shirt and a pair of pliers and rips the emblem off. The result here is the same as the first option; namely, the glue sticks inside the fibers of the garment and is impossible to remove. Neither of these methods results in a clean removal without glue residue on the garment.

With this invention, one may cold pull the emblem using pliers or another tool. The mesh acts as a sort of net that holds all the glue together when pulled up. The result is that the glue comes off the garment with the emblem, leaving zero residue or glue stains behind on the garment. The emblem may also be removed by re-activating the glue and removing the emblem and glue from the garment.

The layer of mesh in the emblem assembly according to various embodiments of this invention may take any of a variety of forms, may have a variety of materials, structures or constructions and may be alternately described as a/an mesh, perforate, foraminous, labyrinth, maze, network, screen, web, intertwined, lace, woven, gossamer, porous, discontinuous, reticulated, sieve or the like layer to allow the adhesive or glue to be removed with the emblem and not be retained on the garment upon removal of the emblem. As such, these and other embodiments of this component of the invention will be collectively and individually referred to herein as the "adhesive retention layer" of the emblem assembly according to various embodiments of this invention.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
FIG. 1 is a front plan view of one substrate upon which an object, such as an emblem assembly, with an adhesive retention layer may be selectively applied and removed from a substrate in the form of a garment such as a work shirt according to this invention.
Figure 2:
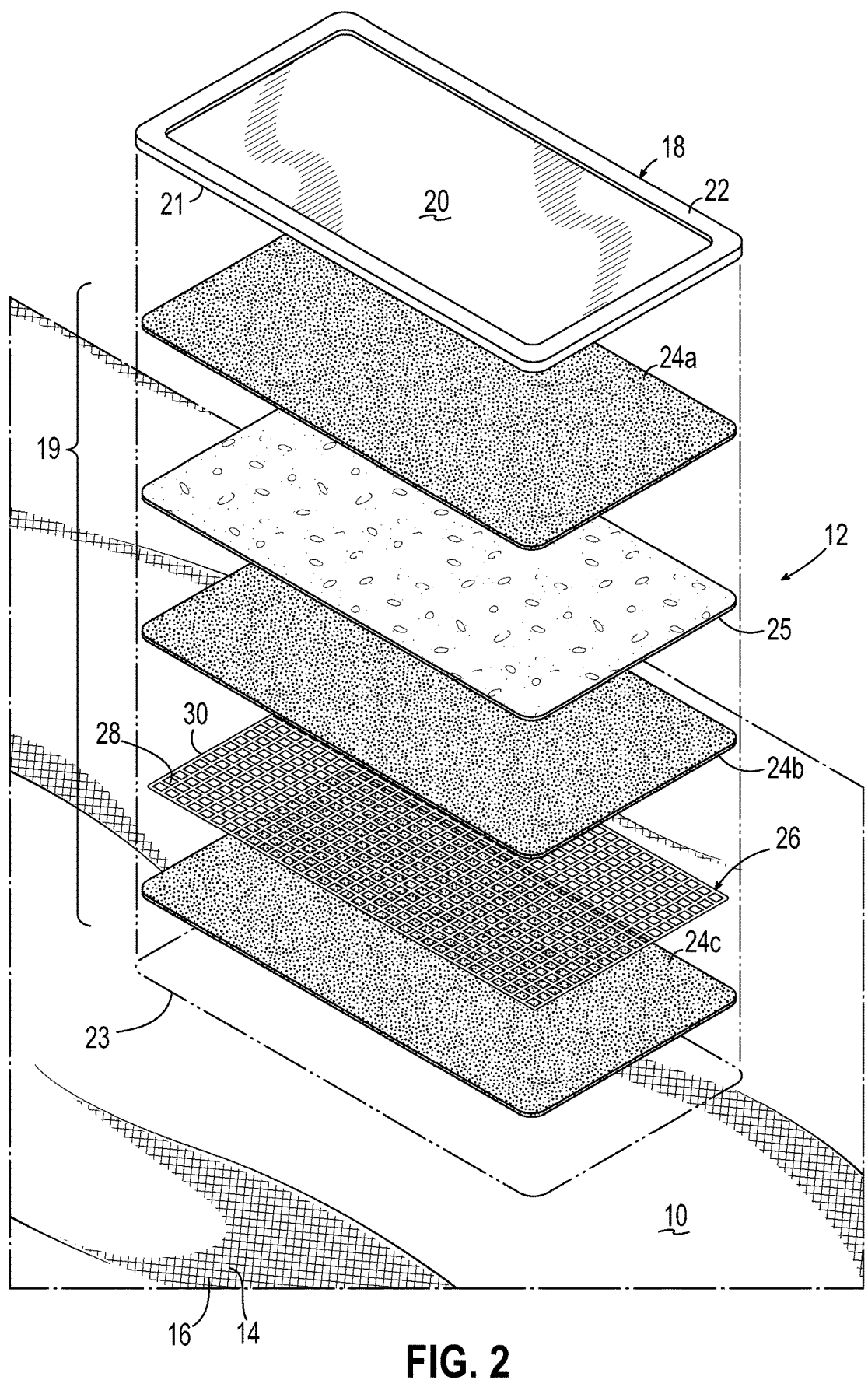
FIG. 2 is an expanded perspective view of the one embodiment of an emblem assembly according to this invention applied to a substrate such as the work shirt of FIG. 1.
Figure 4:
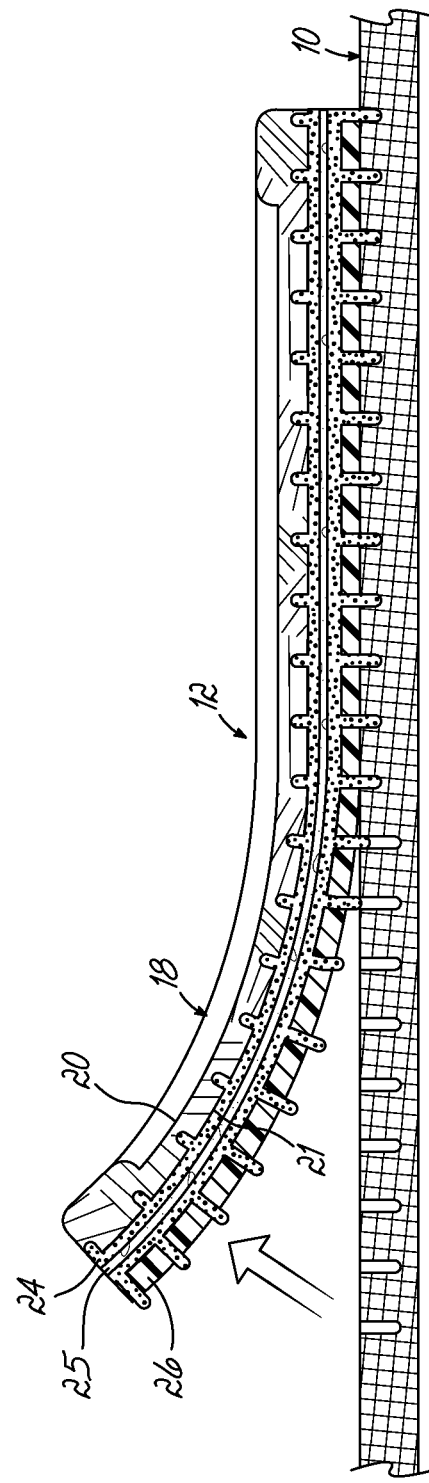
FIG. 4 is a view similar to FIG. 3 but of one embodiment of the emblem assembly according to this invention being removed from the garment without residual adhesive remaining on the garment after removal.

Referring to FIGS. 1, 2 and 4, various embodiments and aspects of this invention are shown. In FIG. 1, a garment or article of clothing 10 in the form of a work shirt provides a substrate for the application of an emblem assembly 12 according to one embodiment of this invention. The garment or substrate 10 may be a textile, fabric or other material and may include interwoven warp 14 and weft 16 strands, yarns or strings of material to form the garment or substrate material. It will be readily appreciated by one of ordinary skill in the art that the substrate 10 to which the emblem assembly 12 is applied is displayed in FIG. 1 and referred to in various places herein as a garment or work shirt, but such may be any of a wide variety of items, articles, materials, products or the like within the scope of this invention. Commonly, the emblem assembly 12 is applied to the garment 10 in the form of a work shirt on the upper left chest area of the garment as is shown in FIG. 1.

In various embodiments of this invention, the emblem assembly 12 includes a standard emblem 18 which as shown in FIGS. 1 and 2 may be a generally rectangular article and display a logo, name or other element on a front face 20 thereof. The emblem 18 may take any one of a variety of embodiments or forms according to aspects of this invention including, but not limited to, a patch, an appliqué, a bullion patch, a doctored patch, an embroidered patch, a handmade or custom patch, a partially embroidered patch, a silk-screened patch, a stock eagle patch, a subdued patch, a tombstone patch, a variation patch or any other item. The emblem 18 may include the front face 20, a back face 21 and a border 22 in the form of a merrowed edge, a cut-edge, a kirk edge, a rolled edge, an overlock edge, a selvedged edge, or any of a variety of edge constructions and designs. Commonly, the emblem 18 may include a cheese cloth or gauze backing (not shown) as is well known in the art. Such a backing is very thin and has an appearance of the type of gauze material used for surgical dressings or first aid. Such a backing is usually utilized as a base for the embroidered body of the emblem or patch and once the emblem or patch is completed, a glue sealant on the back is sprayed or applied and allowed to dry to give the patch a rigid and stiff feel while protecting the delicate embroidery threads of the emblem. Such a backing is embedded and integral with the emblem 18 and is distinctive from other components of the emblem assembly 12 according to various embodiments of this invention as will be described.

The emblem 18 is commonly adhered to a correspondingly sized and dimensioned portion 23 of the garment or substrate 10 by an adhesive assembly 19 which may include one or more components such as one or more layers of adhesive 24 as is commonly known in the art. The adhesive assembly 19 is sized and dimensioned to be confined within the perimeter or footprint of the emblem 18 as shown in FIG. 2. The adhesive 24 covers the back face 21 of the emblem 18 and the portion 23 of the garment or substrate 10 as shown in FIGS. 2 and 4. The adhesive 24 may take any one of a variety of forms and any customary or known adhesive may be utilized with this invention. Multiple layers of adhesive 24a, 24b, 24c may be employed within this invention.

As shown in FIG. 2, an adhesive retention layer 26 is interposed between the emblem 18 and the substrate 10 according to this invention. The adhesive retention layer 26 serves to retain the adhesive 24 on the emblem 18 resulting in little or no adhesive residue remaining on the substrate or the garment 10 upon removal of the emblem 18. The adhesive retention layer 26 is distinct from any backing which may be incorporated into the emblem 18 as previously discussed.

In various embodiments, the adhesive retention layer 26 has a mesh or an open perforate or foranimous construction resulting in a number of openings, holes, apertures or gaps 28 in the construction of the material 30. Each such aperture 28 may be of any shape and the various apertures may be arranged in a uniform or non-uniform configuration throughout the body of the adhesive retention layer 26. One example of a material which may be used as the adhesive retention layer 26 is commercially known as EZ-CREASE® mesh which will be described in more detail herein below. The openings 28 in the adhesive retention layer 26 may extend entirely through the layer 26 or at least partially into the layer 26 according to various embodiments of this invention.

Figure 3:
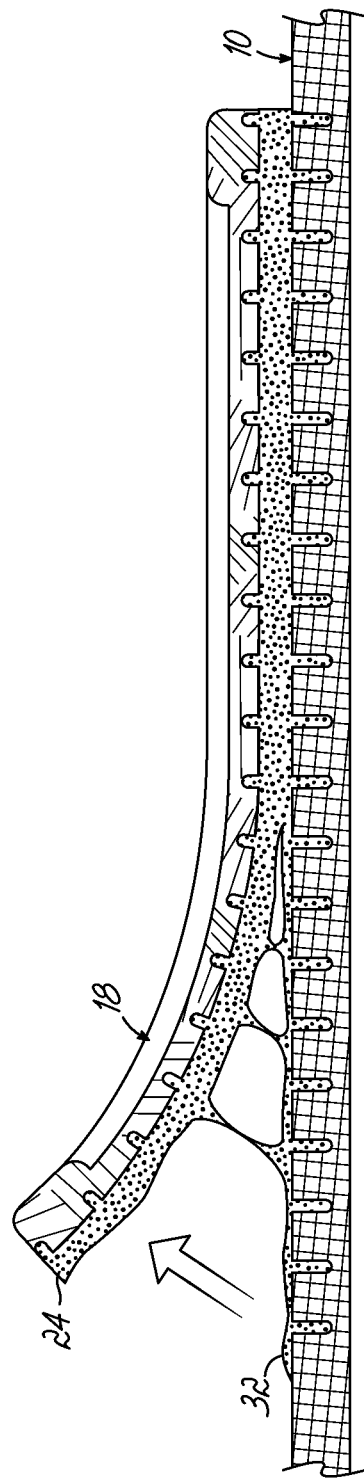
FIG. 3 is a cross-sectional view of a prior art emblem being removed from a garment with residual adhesive remaining on the garment after removal.

The adhesive retention layer 26 allows for the adhesive 24 which is applied to the emblem 18 to extend through the adhesive retention layer 26 and into contact with the garment or substrate 10 as is shown generally in FIG. 4. The adhesive 24 extends into and/or through the openings 28 in the adhesive retention layer 26. The adhesive 24, as is well known in the art, serves to at least temporarily adhere the emblem 18 to the garment substrate 10. The adhesive 24 commonly enters into openings in the textile garment or substrate material and prior to this invention the adhesive or portions thereof would remain as adhesive residue 32 on the garment 10 upon removal of the emblem 18 as is shown in the prior art embodiment of FIG. 3. With this invention, the emblem assembly 12 may be removed either in a heated or non-heated process from the substrate or garment 10 and substantially all of the adhesive 24 remains with the emblem 18 and is removed from the garment or substrate 10 leaving little or no residue of the adhesive 24 on the garment or substrate 10 as is shown in FIG. 4. While a quantitative analysis of the adhesive remaining on the garment 10 is not readily available, the objective of this invention is to make the garment 10 acceptable for re-use in the eyes of the user so one measure is a close visual inspection.

Accordingly, the garment 10 may be reused even after removal of the emblem assembly 12 and a subsequent emblem assembly may be applied to the garment or the garment may be used without any emblem assembly even after removal of an emblem assembly according to various embodiments of this invention since all of the adhesive 24 is removed with the emblem assembly 12 resulting in a clean and presentable appearance for the garment 10. Subsequent emblem assemblies 12 may be applied to the garment as is desired. Moreover, emblem assemblies 12 may be applied, removed and subsequently applied to the same garment 10 throughout the useful life of the garment 10 according to various embodiments of this invention.

Exemplary materials which may be used according to this invention are detailed below. One option for the adhesive removal layer 26 is known as EZ-CREASE® mesh available from Harodite Industries, Inc., Taunton, Mass., www.harodite.com. The inventors understand that EZ-CREASE® mesh is an intimate blend of 50% cotton and 50% polyester and is a woven mesh as it is woven together from threads that have been spun together according to standard industry processes. The warp yarn size of one embodiment of the EZ-CREASE® mesh is 36/1 and the fill is 20/1 with the construction (endsxpicks) of 54×24 and fabric cover factor of 12.64. The openings 28 of one embodiment of the EZ-CREASE® mesh removal layer 26 is 55.3% of the surface area of the removal layer 26 and the woven mesh portion of the removal layer 26 is 44.7% of the surface area. In alternative embodiments, the openings may be 30%, 40%, 50%, 55%, 60%, 70% or any practical and effective portion of the surface area. Moreover, the openings 28 may be evenly or irregularly spaced on the removal layer 26. The EZ-CREASE® mesh product is typically 12-15 mils thick (0.305 mm to 0.381 mm). One of ordinary skill in the art will appreciate that other materials, dimensions and parameters for the removal layer 26 are within the scope of this invention and the specifications presented herein are only some embodiments within this invention.

Another component included in various embodiments of this invention is a barrier layer 25 as shown in particular in FIG. 2. The barrier layer 25 is included to inhibit or prevent bleeding and residue from the emblem 18 in its application onto the garment 10 before and during removal. The barrier layer 25 would be applied to the back of the emblem 18 to prevent unwanted dye transfer and adhesive residue as well as adding adhesive properties that withstand industrial washing and allow for clean removal of the emblem assembly from the garment 10. It is believed that the other components with or without the barrier layer 25 provide a significant benefit for the removal of adhesive 24 when the emblem 18 is being removed from the garment 10 and that the addition of the barrier layer 25 improves the percentage and quantity of adhesive 24 removed from the garment 10 with the emblem 18. Additionally, the barrier layer 25 acts as a blocker and an aid in preventing dye migration (staining) that may be exhibited on select garments 10 from some emblems 18. The barrier layer 25 assists in preventing dye from the emblem 18 from migrating and sinking into the garment 10.

One option for the barrier layer 25 is available from Color-Dec® of Erlanger, Ky., www.color-dec.it. The particular barrier layer according to one embodiment of this invention available from Color-Dec® is ECO/MIGBLOCK-EV01X which is described as a film shaping layer used to block migration of dyes and other materials from fabric.

In addition to the above-described barrier layer 25, other barrier layers which may be used in various embodiments of this invention may be described as resins, resin barriers and like materials. The following is a list of alternative barrier layer materials which may be utilized within the scope of this invention:

Resin,

Rosin,

Abietic acid,

Terpenes/Turpentine,

Plant/synthetic resins,

Pre-peg: pre-impregnated composite fibers,

Ethylene vinyl alcohol (EVOH),

Polyvinylchloride (PVC),

Silicone resins,

ADMER™, and

Other adhesions or composite chemical barrier fabrics such as UV adhesion, industrial adhesive removers including D-BOND™, for example.

A brief explanation of exemplary materials for the emblem assembly 18 follows. F18/C5/F5 fabric is a specific fabric style used on many emblems. Two, three or five mil thickness of white or clear urethane may be used as an adhesive layer. Urethane is a white or clear, heat activated glue used universally by emblem suppliers. Many different types, compositions, and brands are available, but all are very similar commodity type products that meet the goal of adhering fabric emblems to garments when heat applied. The term "mil" refers to thickness of the glue; wherein, 1 mil=1/1,000 inch. White or clear urethane is used depending on the color of the emblem fabric. White is used when the emblem fabric is especially sheer and allows the potential of being seen through. The difference between white and clear is only in color and what it allows you to see through or not and does not affect the strength of application or any other parameter.

Exemplary embodiment No. 1 utilizes a standard twill background fabric of 65% polyester and 35% cotton emblem assembly 12 with the following stacked components:

▒▒▒▒▒▒▒▒ Fabric of 65% polyester and 35% cotton emblem

▒▒▒▒▒▒▒▒ 2 mil White Urethane

▒▒▒▒▒▒▒▒ Polyurethane-based Blocker with Ethylene Vinyl Alcohol

▒▒▒▒▒▒▒▒ 2 mil Clear Urethane

▒▒▒▒▒▒▒▒ 12-15 mil EZ-CREASE® mesh

▒▒▒▒▒▒▒▒ 2 mil Clear Urethane.

This emblem assembly 12 may be applied to a garment at 400° F. for 10 seconds, with 60 psi of pressure.

Exemplary embodiment No. 2 utilizes a standard twill background emblem assembly 12 with the following stacked components:

▒▒▒▒▒▒▒▒ F18 fabric emblem

▒▒▒▒▒▒▒▒ 3 mil White Urethane

▒▒▒▒▒▒▒▒ Polyurethane-based Blocker with Ethylene Vinyl Alcohol

▒▒▒▒▒▒▒▒ 3 mil Clear Urethane

▒▒▒▒▒▒▒▒ 12-15 mil EZ-CREASE® mesh

▒▒▒▒▒▒▒▒ 3 mil Clear Urethane.

This emblem assembly 12 may be applied to a garment at 400° F. for 10 seconds, with 60 psi of pressure.

Exemplary embodiment No. 3 utilizes a blue micro check C5 emblem assembly 12 with the following stacked components:

▒▒▒▒▒▒▒▒ C5 Fabric emblem

▒▒▒▒▒▒▒▒ 5 mil Clear Urethane

▒▒▒▒▒▒▒▒ 12-15 mil EZ-CREASE® mesh

▒▒▒▒▒▒▒▒ 3 mil Clear Urethane

This emblem assembly 12 may be applied to a garment at 400° F. for 10 seconds, with 60 psi of pressure.

Exemplary embodiment No. 4 utilizes a 275 Red F5 emblem assembly 12 with the following Components:

▒▒▒▒▒▒▒▒ F5 Fabric emblem

▒▒▒▒▒▒▒▒ 5 mil Clear Urethane

▒▒▒▒▒▒▒▒ 12-15 mil EZ-CREASE® mesh

▒▒▒▒▒▒▒▒ 3 mil Urethane

This emblem assembly 12 may be applied to a garment at 400° F. for 10 seconds, with 60 psi of pressure.

These foregoing embodiments of the invention are exemplary only and in no manner should be viewed as exhaustive or limiting on the scope of this invention. Alternative numbers of components, method steps, materials, parameters, arrangements and other aspects may be utilized within the scope of this invention.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A method of associating an emblem assembly with a substrate wherein the substrate is a textile substrate having interwoven strands of material defining openings therebetween, the method comprising the steps of:

interposing an adhesive assembly having a first layer of adhesive between a back face of an emblem and the substrate;

covering the back face of the emblem and a correspondingly sized and dimensioned portion of the substrate with the adhesive assembly;

interposing an adhesive retention layer as a component of the adhesive assembly between the back face of the emblem and the substrate to substantially cover the back face of the emblem, wherein the first layer of adhesive is in contact with the adhesive retention layer;

wherein the adhesive assembly is confined within a perimeter of the emblem and contacts both the emblem and the substrate;

adhering the emblem to the substrate in a wash-durable manner with the first layer of adhesive;

interposing at least a portion of the first layer of adhesive into the openings as part of the adhering step; and after the adhering step, removing the emblem assembly from the substrate inclusive of the layer of adhesive such that substantially none of the first layer of adhesive is visible on the substrate after the removing step.

2. The method of claim 1 further comprising:
washing the substrate and emblem assembly multiple times after the adhering step and prior to the removing step.

3. The method of claim 1 further comprising:
interposing a barrier layer between the back face of the emblem and the substrate to inhibit migration of residue from the emblem onto the substrate.

4. The method of claim 1 wherein the removing step further comprises one of the following steps:
cold pulling the emblem assembly from the substrate; and
heating the first layer of adhesive to pull the emblem assembly from the substrate.

5. The method of claim 1 wherein the removing step further comprises:
retaining the first layer of adhesive on the emblem with the adhesive retention layer.

6. The method of claim 1 further comprising after the removing step:
visually inspecting the substrate to determine that substantially none of the first layer of adhesive remains on the substrate.

7. The method of claim 1 further comprising:
embedding the adhesive retention layer into the first layer of adhesive.

8. The method of claim 3 further comprising:
interposing a second layer of adhesive between the barrier layer and the emblem.

9. The method of claim 8 further comprising:
interposing a third layer of adhesive between the barrier layer and the adhesive retention layer.

10. A method of associating an emblem assembly with a textile substrate having interwoven strands of material defining openings therebetween, the method comprising the steps of:
interposing an adhesive assembly having a first layer of adhesive between a back face of an emblem and the substrate to substantially cover the back face of the emblem;
interposing an adhesive retention layer as a component of the adhesive assembly between the back face of the emblem and the substrate wherein the first layer of adhesive is in contact with the adhesive retention layer;
interposing a barrier layer as a component of the adhesive assembly between the back face of the emblem and the substrate to inhibit migration of residue from the emblem onto the substrate;
wherein the adhesive assembly is confined within a perimeter of the emblem and contacts both the emblem and the textile substrate;
adhering the emblem to the substrate in a wash-durable manner with the first layer of adhesive, wherein at least a portion of the first layer of adhesive enters the opening;
washing the substrate and emblem assembly multiple times after the adhering step; and
after the washing step, removing the emblem assembly from the substrate inclusive of the layer of adhesive such that substantially none of the first layer of adhesive is visible on the substrate after the removing step.

11. The method of claim 10 wherein the removing step further comprises one of the following steps:
cold pulling the emblem assembly from the substrate; and
heating the first layer of adhesive to pull the emblem assembly from the substrate.

12. The method of claim 10 wherein the removing step further comprises:
retaining the first layer of adhesive on the emblem with the adhesive retention layer.

13. The method of claim 10 further comprising after the removing step:
visually inspecting the substrate to determine that substantially none of the first layer of adhesive remains on the substrate.

14. The method of claim 10 further comprising:
embedding the adhesive retention layer into the first layer of adhesive.

15. The method of claim 10 further comprising:
interposing a second layer of adhesive between the barrier layer and the emblem.

16. The method of claim 15 further comprising:
interposing a third layer of adhesive between the barrier layer and the adhesive retention layer.

17. A method of associating an emblem assembly with a textile substrate having interwoven strands of material defining openings therebetween, the method comprising the steps of:
interposing an adhesive assembly having a first layer of adhesive between a back face of an emblem and the substrate to substantially cover the back face of the emblem;
interposing an adhesive retention layer as a component of the adhesive assembly between the back face of the emblem and the substrate wherein the first layer of adhesive is in contact with the adhesive retention layer;
embedding the adhesive retention layer into the first layer of adhesive;
interposing a barrier layer as a component of the adhesive assembly between the back face of the emblem and the substrate to inhibit migration of residue from the emblem onto the substrate;
interposing a second layer of adhesive as a component of the adhesive assembly between the barrier layer and the emblem;
interposing a third layer of adhesive as a component of the adhesive assembly between the barrier layer and the adhesive retention layer;
wherein the adhesive assembly is confined within a perimeter of the emblem and contacts both the emblem and the textile substrate;
adhering the emblem to the substrate in a wash-durable manner with the first layer of adhesive wherein at least a portion of the first layer of adhesive enters the openings;
washing the substrate and emblem assembly multiple times after the adhering step; and
after the washing step, removing the emblem assembly from the substrate inclusive of the adhesive assembly such that substantially none of the adhesive assembly is visible on the substrate after the removing step.

18. The method of claim 17 wherein the removing step further comprises one of the following steps:
cold pulling the emblem assembly from the substrate; and
heating the first layer of adhesive to pull the emblem assembly from the substrate.

19. The method of claim 18 wherein the removing step further comprises:
retaining the first layer of adhesive on the emblem with the adhesive retention layer.

20. The method of claim 19 further comprising after the removing step:

visually inspecting the substrate to determine that substantially none of the first layer of adhesive remains on the substrate.

21. The method of claim 1 wherein the removing step results in substantially all of the adhesive assembly remaining attached to the emblem.

22. The method of claim 10 wherein the removing step results in substantially all of the adhesive assembly remaining attached to the emblem.

23. The method of claim 17 wherein the removing step results in substantially all of the adhesive assembly remaining attached to the emblem.

24. The method of claim 1 further comprising:
sizing the adhesive assembly to be the same as the emblem.

25. The method of claim 10 further comprising:
sizing the adhesive assembly to be the same as the emblem.

26. The method of claim 17 further comprising:
sizing the adhesive assembly to be the same as the emblem.

* * * * *